United States Patent
Yamamoto et al.

(10) Patent No.: US 10,186,063 B2
(45) Date of Patent: Jan. 22, 2019

(54) IMAGE PROCESSING APPARATUS, NON-TRANSITORY COMPUTER READABLE MEDIUM, AND IMAGE PROCESSING METHOD FOR GENERATING A COMPOSITE IMAGE

(71) Applicant: FUJI XEROX CO., LTD., Tokyo (JP)

(72) Inventors: Takayuki Yamamoto, Kanagawa (JP); Kosuke Maruyama, Kanagawa (JP); Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/558,924

(22) Filed: Dec. 3, 2014

(65) Prior Publication Data
US 2015/0348298 A1 Dec. 3, 2015

(30) Foreign Application Priority Data
May 27, 2014 (JP) .................. 2014-109576

(51) Int. Cl.
*G06K 9/36* (2006.01)
*G06T 11/60* (2006.01)
*G06T 11/00* (2006.01)

(52) U.S. Cl.
CPC ............ *G06T 11/60* (2013.01); *G06T 11/001* (2013.01)

(58) Field of Classification Search
CPC ................................ G06T 11/60; G06T 11/001
USPC ........................................................... 382/284
See application file for complete search history.

(56) References Cited

U.S. PATENT DOCUMENTS

| | | | |
|---|---|---|---|
| 6,075,905 A | 6/2000 | Herman et al. | |
| 6,862,364 B1 * | 3/2005 | Berestov | G06T 5/008 345/426 |
| 7,340,099 B2 | 3/2008 | Zhang | |
| 8,068,693 B2 | 11/2011 | Sorek et al. | |
| 2007/0223831 A1 * | 9/2007 | Mei | G06T 5/50 382/260 |
| 2010/0225785 A1 | 9/2010 | Shimizu et al. | |
| 2011/0118595 A1 * | 5/2011 | Aulbach | A61B 6/032 600/425 |

(Continued)

FOREIGN PATENT DOCUMENTS

| | | |
|---|---|---|
| CN | 101853498 A | 10/2010 |
| CN | 102360490 A | 2/2012 |
| JP | 10-222651 A | 8/1998 |

(Continued)

OTHER PUBLICATIONS

Shirley, Peter. "Color transfer between images." IEEE Corn 21 (2001): 34-41.*

(Continued)

*Primary Examiner* — Andrew Moyer
(74) *Attorney, Agent, or Firm* — Sughrue Mion, PLLC

(57) ABSTRACT

Provided is an image processing apparatus including a composite image generation unit that composes a first image that is an attachment target image and a second image to be attached to the first image to generate a composite image in which the second image is included in the first image, a feature quantity acquisition unit that acquires a feature quantity of the first image, and a reflection unit that reflects a feature of the first image into the second image using the feature quantity of the first image acquired by the feature quantity acquisition unit.

21 Claims, 13 Drawing Sheets

(56) References Cited

U.S. PATENT DOCUMENTS

| | | | |
|---|---|---|---|
| 2012/0039534 A1* | 2/2012 | Malik | H03M 7/3064 |
| | | | 382/173 |
| 2014/0035950 A1* | 2/2014 | Jonsson | G06T 11/60 |
| | | | 345/629 |

FOREIGN PATENT DOCUMENTS

| | | |
|---|---|---|
| JP | 11-331554 A | 11/1999 |
| JP | 2010-206685 A | 9/2010 |
| JP | 2010206685 A | 9/2010 |

OTHER PUBLICATIONS

Communication dated Mar. 3, 2016, issued by the Australian Patent Office in counterpart Australian application No. 2014280984.

Erik Reinhard et al., "Color Transfer between Images", IEEE Computer Graphics and Application Sep./Oct. 2001, pp. 34-41, vol. 21.

Communication dated Nov. 17, 2017, issued by the Australian Intellectual Property Office in counterpart Australian application No. 2017201441.

Communication dated Mar. 13, 2018 from the Japanese Patent Office in counterpart application No. 2014-109576.

Communication dated Dec. 28, 2017 from the State Intellectual Property Office of the P.R.C. in counterpart Application No. 201510006901.6.

Communication dated Oct. 16, 2018, issued by the Japan Patent Office in corresponding Japanese Application No. 2014-109576.

Communication dated Oct. 8, 2018, issued by the State Intellectual Property Office of the P.R.C. in corresponding Chinese Application No. 201510006901.6.

Wu Hao et al., "Color Preserved Image Compositing", Journal of Software, 2012,23(Suppl.(2)):94-104, ISSN 1000-9825, Coden Ruxuew (11 pages total).

* cited by examiner

SCENE IMAGE

ATTACHMENT SOURCE IMAGE

COMPOSITE IMAGE HAVING SENSE OF DISCOMFORT

COMPOSITE IMAGE HAVING REDUCED SENSE OF DISCOMFORT

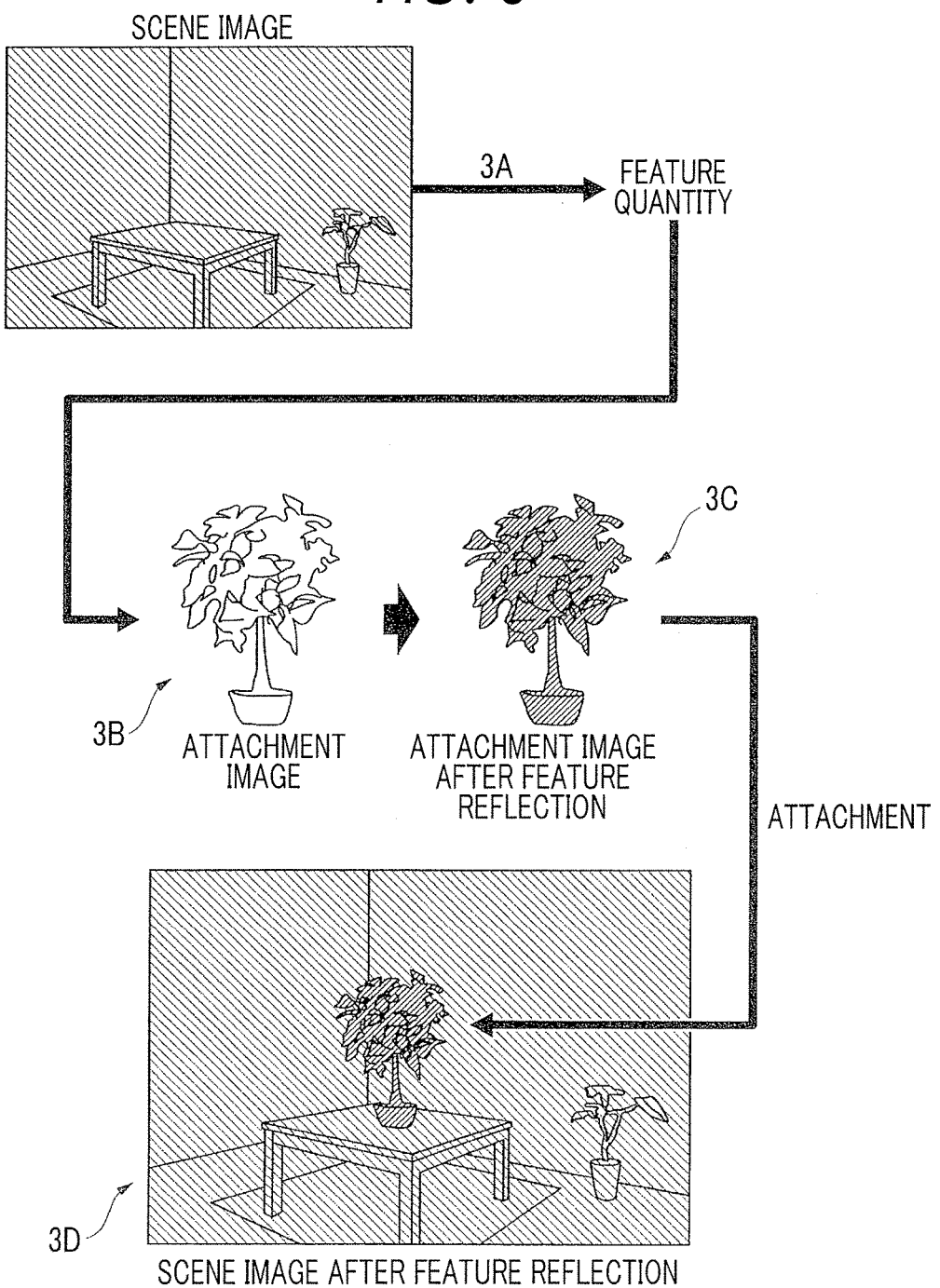

ATTACHMENT IMAGE

ATTACHMENT IMAGE

FEATURE MERGING REGION
(FEATURE REFLECTION REGION)

FIG. 11
FEATURE REFLECTED SCENE IMAGE
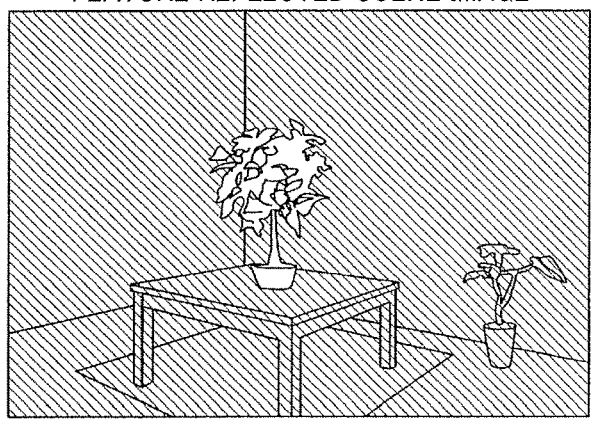
FEATURE REFLECTED SCENE IMAGE
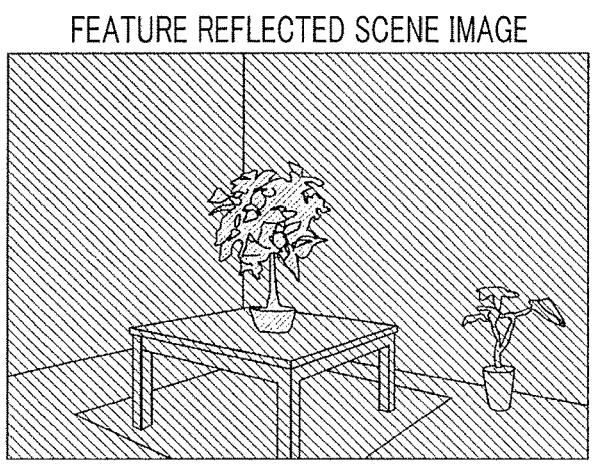
FEATURE REFLECTED SCENE IMAGE
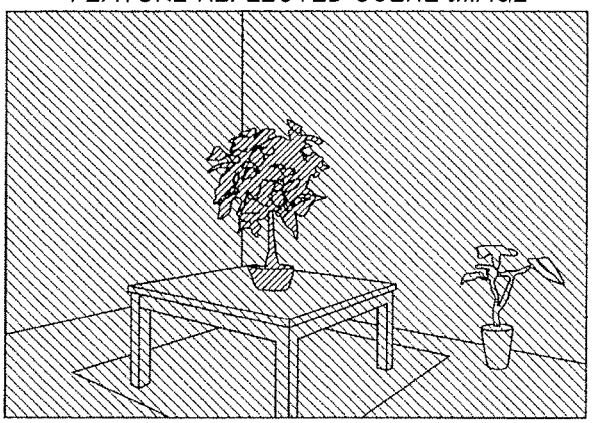
$\alpha$ = SMALL
$\alpha$ = LARGE

IMAGE PROCESSING APPARATUS, NON-TRANSITORY COMPUTER READABLE MEDIUM, AND IMAGE PROCESSING METHOD FOR GENERATING A COMPOSITE IMAGE

CROSS-REFERENCE TO RELATED APPLICATIONS

This application is based on and claims priority under 35 USC 119 from Japanese Patent Application No. 2014-109576 filed May 27, 2014.

BACKGROUND

Technical Field

The present invention relates to an image processing apparatus, a non-transitory computer readable medium, and an image processing method.

SUMMARY

According to an aspect of the invention, there is provided an image processing apparatus including:

a composite image generation unit that composes a first image that is an attachment target image and a second image to be attached to the first image to generate a composite image in which the second image is included in the first image;

a feature quantity acquisition unit that acquires a feature quantity of the first image; and a reflection unit that reflects a feature of the first image into the second image using the feature quantity of the first image acquired by the feature quantity acquisition unit.

BRIEF DESCRIPTION OF THE DRAWINGS

Exemplary embodiments of the present invention will be described in detail based on the following figures, wherein:

FIG. 3 is a diagram illustrating an outline of processing executed by a control unit when an attachment image is attached to a scene image;

FIG. 11 is a diagram illustrating another processing example performed in an image processing apparatus;

DETAILED DESCRIPTION

Hereinafter, exemplary embodiments of the invention will be described with reference to the accompanying drawings.

Figure 1:
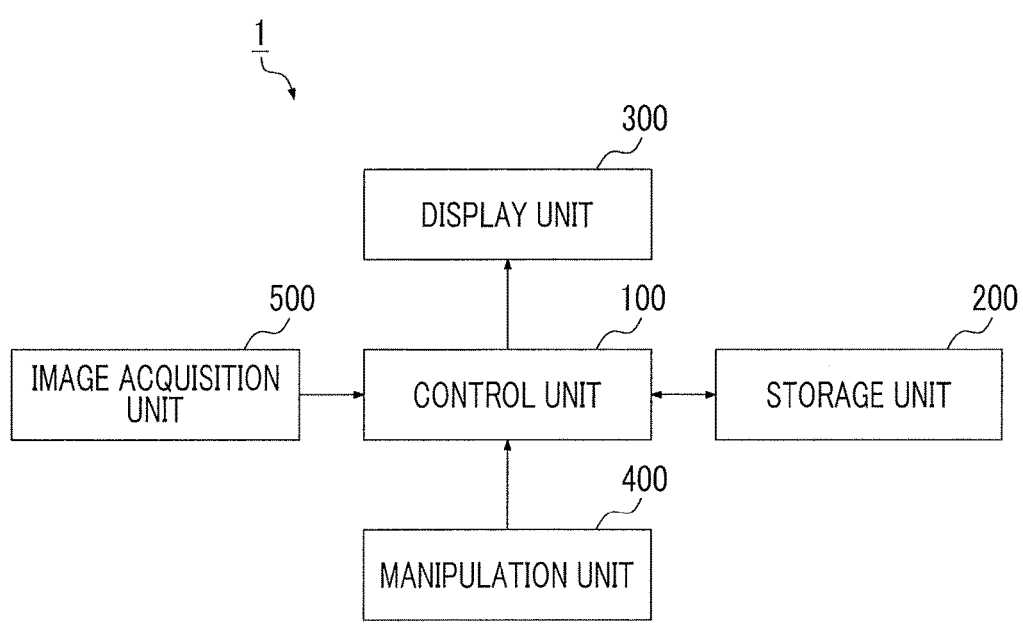
FIG. 1 is a block diagram illustrating an example of a hardware configuration of an image processing apparatus according to an exemplary embodiment of the invention.

FIG. 1 is a block diagram illustrating an example of a hardware configuration of an image processing apparatus 1 according to an exemplary embodiment of the invention. The image processing apparatus 1 of the present exemplary embodiment includes a control unit 100, a storage unit 200, a display unit 300, a manipulation unit 400, and an image acquisition unit 500.

The control unit 100 includes a central processing unit (CPU), a read only memory (ROM), and a random access memory (RAM) (all not illustrated).

The ROM stores a control program to be executed by the CPU. The CPU reads the control program stored in the ROM, and executes the control program using the RAM as a work area. As the control program is executed by the CPU, respective functional parts such as an image attachment unit 11 to be described later are realized.

The program executed by the CPU is provided to the image processing apparatus 1 in a state of being stored in a computer readable recording medium such as a magnetic recording medium (magnetic tape, magnetic disk, or the like), an optical recording medium (optical disc, or the like), a magnetic optical recording medium, or a semiconductor memory. Further, the program may be downloaded to the image processing apparatus 1 using a communication device such as the Internet.

The storage unit 200 is configured by a hard disk device, for example, and stores a variety of data such as image data.

The display unit 300 is configured by a liquid crystal touch panel display, for example, and displays an image, for example, based on image data under the control of the control unit 100.

The manipulation unit 400 is a part in which a manipulation of a user is performed, and acquires information input by the user. The manipulation unit 400 is configured by a liquid crystal touch panel display, for example. Here, when the manipulation unit 400 and the display unit 300 are configured by the liquid crystal touch panel display, the manipulation unit 400 and the display unit 300 may be configured by a common material. The manipulation unit 400 may be configured by a mouse, a keyboard, or the like.

The image acquisition unit 500 acquires an image (image data) provided by the user. Specifically, the image acquisition unit 500 acquires a scene image, an attachment source image, or the like to be described later. The image acquisition unit 500 is configured by a connection interface connected to an external device, for example. Further, in the present exemplary embodiment, if an image is acquired by the image acquisition unit 500, the image is output to the storage unit 200 to be stored therein.

FIGS. 2A to 2D are diagrams illustrating a processing example in the image processing apparatus 1.

Figure 2A:
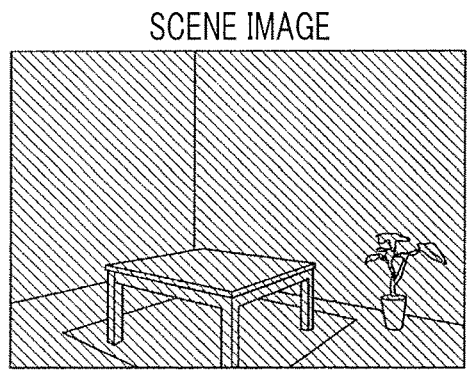
FIGS. 2A to 2D are diagrams illustrating a processing example in an image processing apparatus.
Figure 2B:
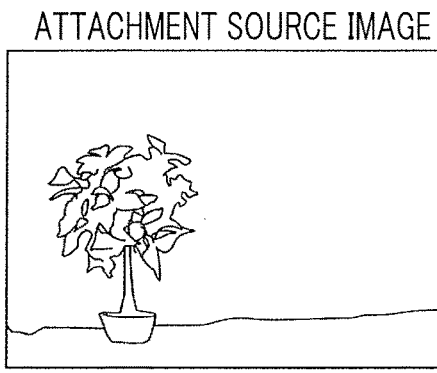
Figure 2C:
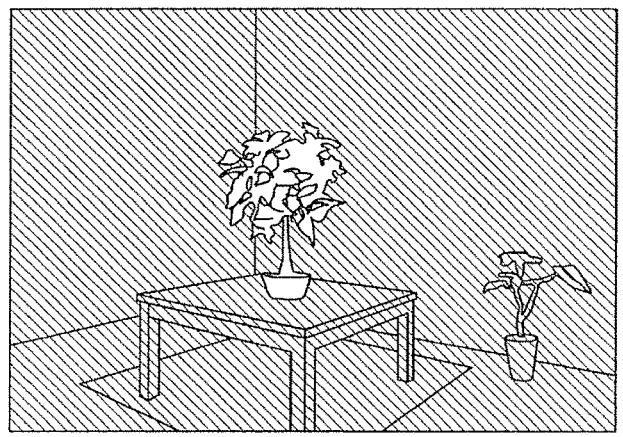
Figure 2D:
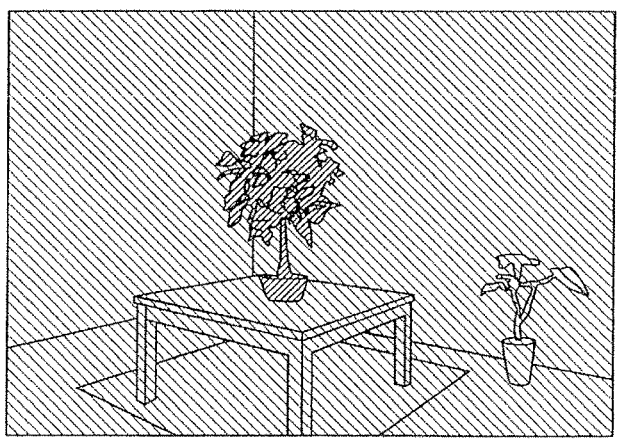

FIGS. 2A to 2D illustrate a process of attaching a part of an attachment source image illustrated in FIG. 2B to a scene image (attachment target image) illustrated in FIG. 2A, and a process of generating a composite image illustrated in FIG. 2C or FIG. 2D.

Specifically, FIGS. 2A to 2D illustrate an example in which an image of a "flowerpot" ("flowerpot" placed outdoors) included in the attachment source image illustrated in FIG. 2B is attached to the scene image that represents the indoors, illustrated in FIG. 2A, to generate a composite image of the indoors where the "flowerpot" is placed.

Hereinafter, in this description, an image attached to a scene image, like the "flowerpot", may be referred to as an "attachment image".

Here, if an attachment image is simply attached to a scene image, a composite image with a sense of discomfort is easily generated. Specifically, referring to FIGS. 2A to 2D, if the "flowerpot" image placed outdoors is attached to the scene image that represents the indoors, a composite image with a sense of discomfort is easily generated, as illustrated in FIG. 2C.

In contrast, in processing according to the present exemplary embodiment to be described below, a feature of the scene image (feature of scene) is reflected into the "flowerpot" image, and thus, a composite image having a reduced sense of discomfort is generated, as illustrated in FIG. 2D.

FIG. 3 is a diagram illustrating an outline of processing executed by the control unit 100 when the attachment image is attached to the scene image.

In the processing of the present exemplary embodiment, as indicated by reference sign 3A of FIG. 3, a feature (feature quantity) of the scene image is grasped. Then, the feature is reflected into the attachment image indicated by reference sign 3B. Thus, a feature reflected attachment image is generated as indicated by reference sign 3C. Then, the feature reflected attachment image is attached to the scene image. Thus, the sense of discomfort of the scene image is reduced as indicated by reference sign 3D.

Figure 4:
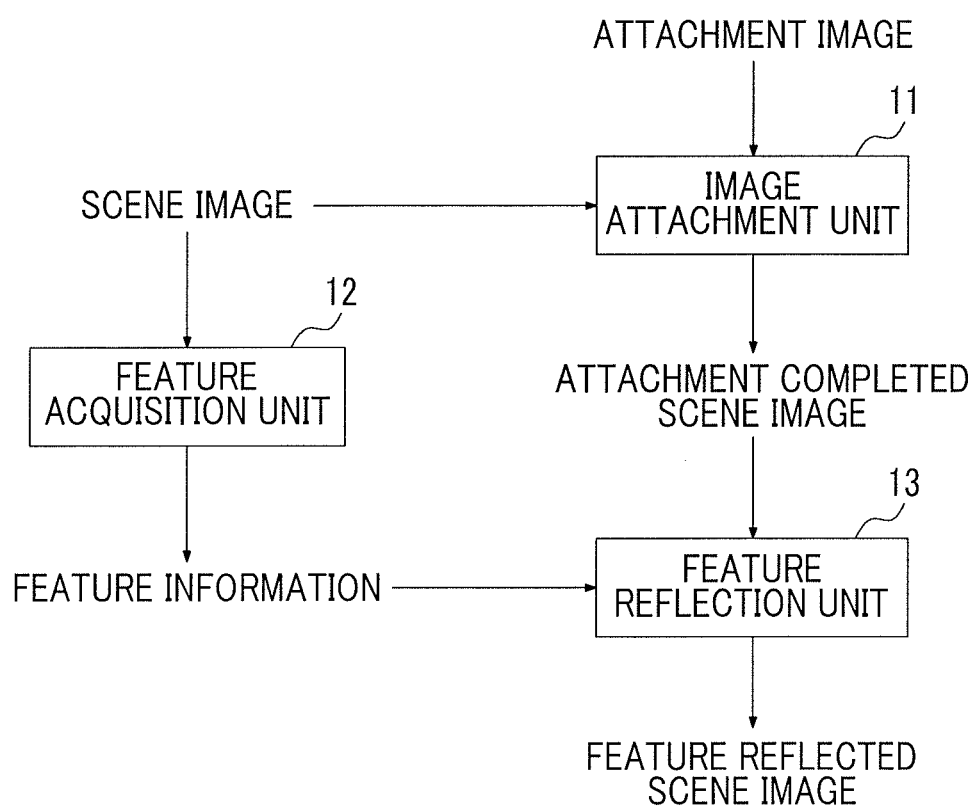
FIG. 4 is a flowchart illustrating the flow of processing executed by a control unit when an attachment image is attached to a scene image.

FIG. 4 is a flowchart illustrating the flow of the processing executed by the control unit 100 when the attachment image is attached to the scene image.

In the processing of the present exemplary embodiment, first, a manipulation of a user is performed for an attachment source image (see FIG. 2B) to cut and acquire an attachment image such as the "flowerpot" from the attachment source image. Then, the attachment image is input to the image attachment unit 11 that functions as a composite image generation unit.

The image attachment unit 11 attaches the attachment image (second image) to the scene image (first image) to generate a composite image in which the attachment image is included in the scene image.

In other words, in the present exemplary embodiment, before the attachment image is attached to the scene image, the scene image is output from the storage unit 200 (FIG. 1) to the image attachment unit 11.

After the attachment image is input to the image attachment unit 11, the attachment of the attachment image to the scene image is performed to generate a scene image in which the attachment image is attached (which will be hereinafter referred to as an "attachment completed scene image"). Then, the attachment completed scene image is output to a feature reflection unit (feature merging unit) 13.

Meanwhile, the scene image output from the storage unit 200 is also input to a feature acquisition unit 12 that functions as a feature quantity acquisition unit, so that the feature (feature quantity) of the scene image is acquired by the feature acquisition unit 12. Further, feature information that is information relating to the feature is output to the feature reflection unit 13.

Then, the feature reflection unit 13 that functions as a reflection unit reflects the feature of the scene image in the attachment image based on the feature information. Thus, the attachment completed scene image in which the feature of the scene image is reflected into the attachment image (which will be hereinafter referred to as a "feature reflected scene image") is generated. In other words, an image such as an image indicated by reference sign 3D of FIG. 3 is generated.

Here, the processing of the feature acquisition unit 12 will be described. The feature acquisition unit 12 calculates E (L* scene), E (a* scene) and E (b* scene) that are averages of L* pixels, a* pixels and b* pixels of the entire scene image in the L*a*b* color space as feature quantities, as illustrated in FIGS. 5B, 5D and 5F from among FIGS. 5A to 5F (that are diagrams illustrating the processing performed by the feature acquisition unit 12). Further, the feature acquisition unit 12 also calculates V (L* scene), V (a* scene) and V (b* scene) that are variances of the L* pixels, the a* pixels and the b* pixels of the entire scene image as feature quantities.

The feature reflection unit 13 adjusts Lab values (CIE Lab values) of the attachment image using the averages and variances calculated by the feature acquisition unit 12 and using the following Expressions (1) to (3), for each pixel.

$$L^{*\prime}=(L^*-E(L^*_{clip}))(V(L^*_{scene})/V(L^*_{clip}))+E(L^*_{scene}) \quad (1)$$

$$a^{*\prime}=(a^*-E(a^*_{clip}))(V(a^*_{scene})/V(a^*_{clip}))+E(a^*_{scene}) \quad (2)$$

$$b^{*\prime}=(b^*-E(b^*_{clip}))(V(b^*_{scene})/V(b^*_{clip}))+E(b^*_{scene}) \quad (3)$$

In Expressions (1) to (3), $L^*$, $a^*$ and $b^*$ represent pixel values of the attachment image before adjustment, and $L^{*\prime}$, $a^{*\prime}$ and $b^{*\prime}$ represent pixel values of the attachment image after adjustment.

Figure 5A:
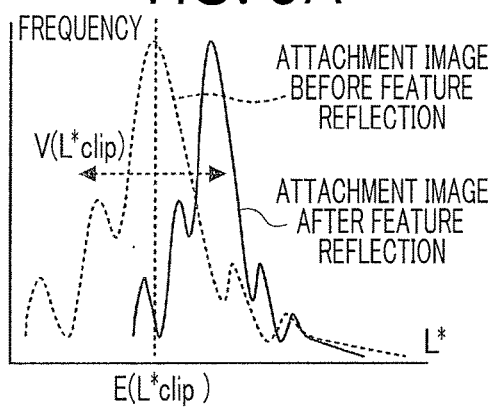
FIGS. 5A to 5F are diagrams illustrating processing performed by a feature acquisition unit.
Figure 5B:
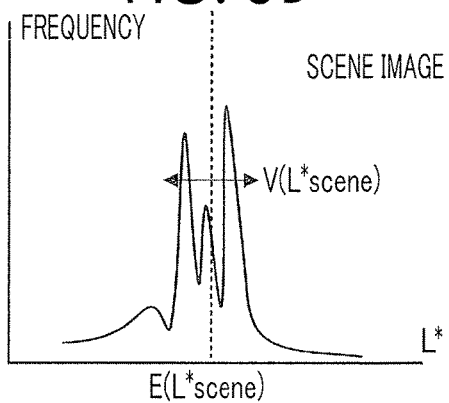
Figure 5C:
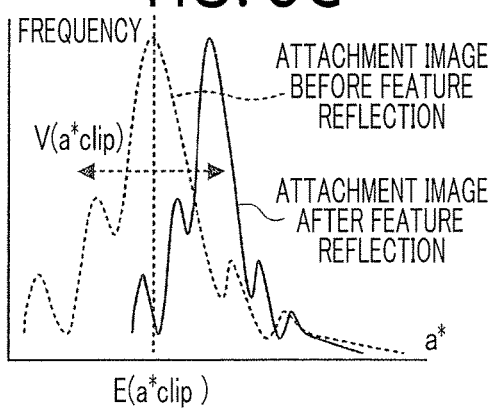
Figure 5D:
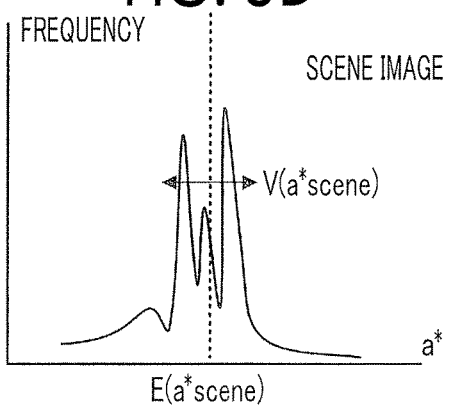
Figure 5E:
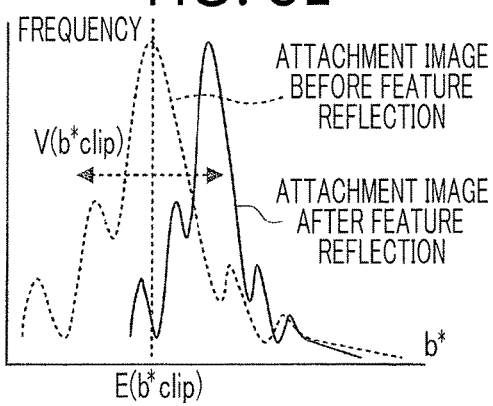
Figure 5F:
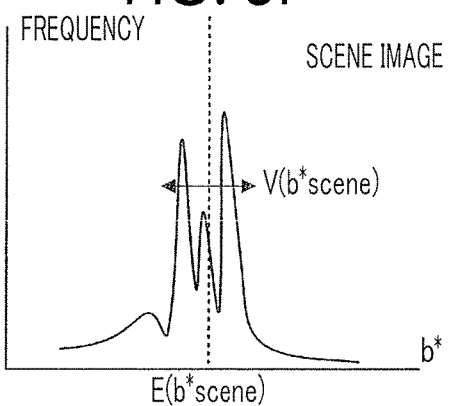

Further, $E(L^*_{clip})$, $E(a^*_{clip})$ and $E(b^*_{clip})$ represent the average values of the $L^*$, the $a^*$ and the $b^*$ values of the attachment image (attachment image before feature reflection), as illustrated in FIGS. 5A, 5C and 5E, and $V(L^*_{clip})$ $V(a^*_{clip})$ and $V(b^*_{clip})$ represent the variances of the $L^*$, the $a^*$ and the $b^*$ values of the attachment image (attachment image before feature reflection), as illustrated in FIGS. 5A, 5C and 5E.

Figure 6A:
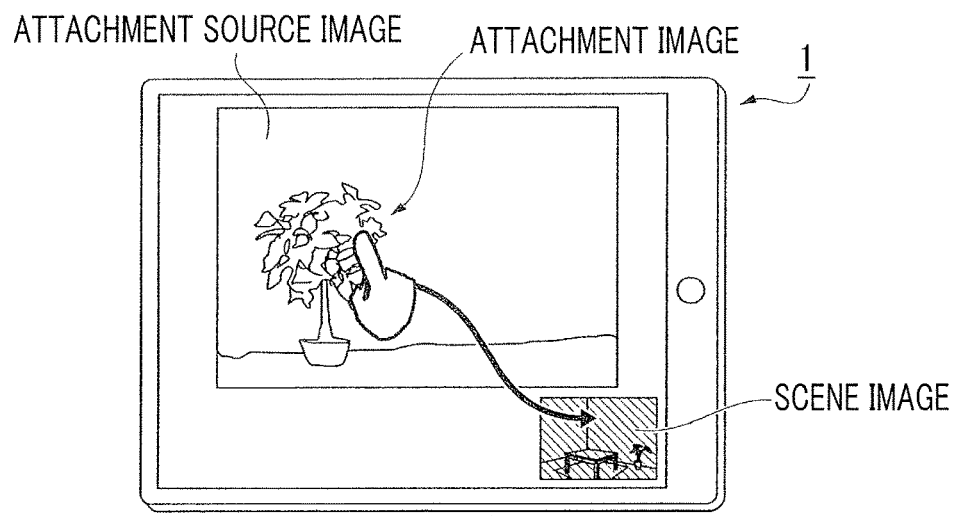
FIGS. 6A to 6C are diagrams illustrating an example of processing performed in an image processing apparatus.
Figure 6B:
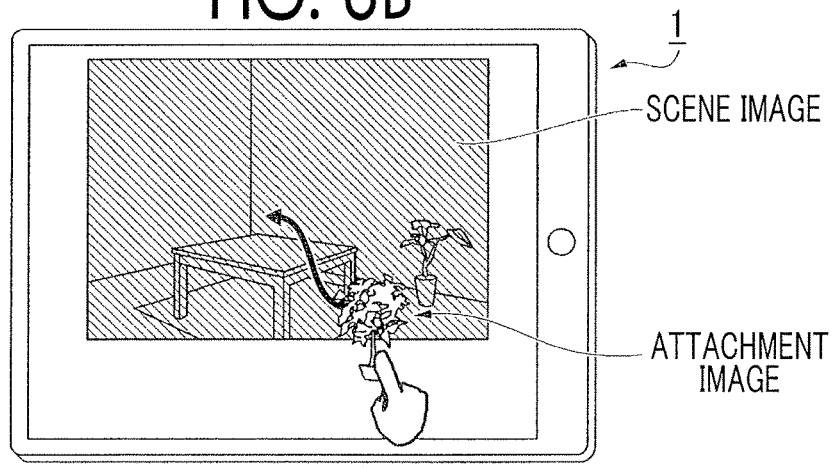
Figure 6C:
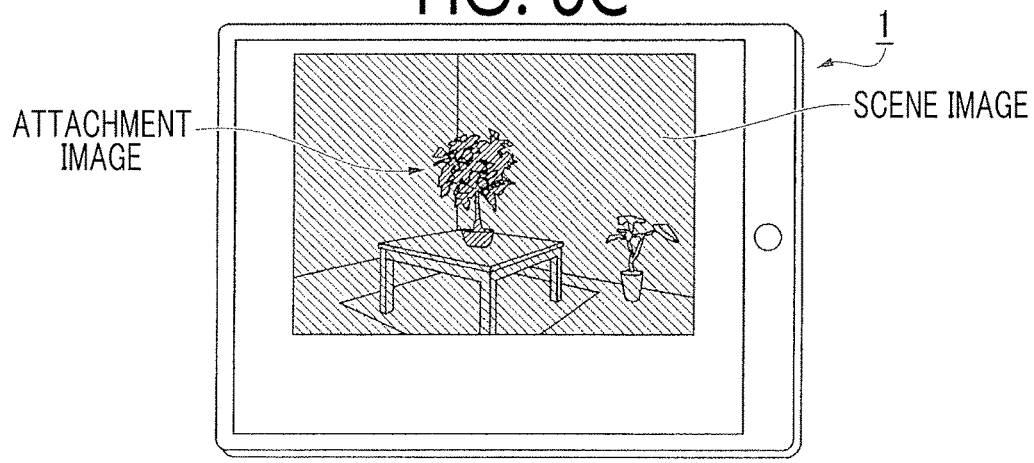

FIGS. 6A to 6C are diagrams illustrating an example of processing performed in the image processing apparatus 1. FIGS. 6A to 6C illustrate an example in which the image processing apparatus 1 is configured by a so-called tablet terminal.

In this processing, as illustrated in FIG. 6A, the attachment source image and the scene image are displayed on a single screen. Here, the attachment source image is displayed to be larger in size than the scene image.

Further, in this processing, as illustrated in FIG. 6A, for example, the user traces an outline of the attachment image included in the attachment source image to separate the attachment image from the attachment source image. In this example, the user separates the attachment image by manipulating a touch panel, but may separate the attachment image by manipulating a mouse or the like. Further, the separation of the attachment image may be performed by a method for directly designating a region, or may be performed using a graph cut algorithm or a grow cut algorithm.

Thereafter, as indicated by an arrow in FIG. 6A, the user moves the attachment image to the scene image positioned in a lower right part of the screen by drag and drop. Thus, as illustrated in FIG. 6B, the attachment source image disappears, and instead, the scene image is displayed. Then, the user moves the attachment image to a user's desired location in the scene image, and separates the hand from the display screen. Thus, as illustrated in FIG. 6C, the attachment image is attached to the scene image. Further, the feature of the scene image is reflected into the attachment image, which reduces the sense of discomfort of the entire image.

The feature of the scene image may be grasped from the entire scene image, or may be grasped from a part of the scene image.

Figure 7:
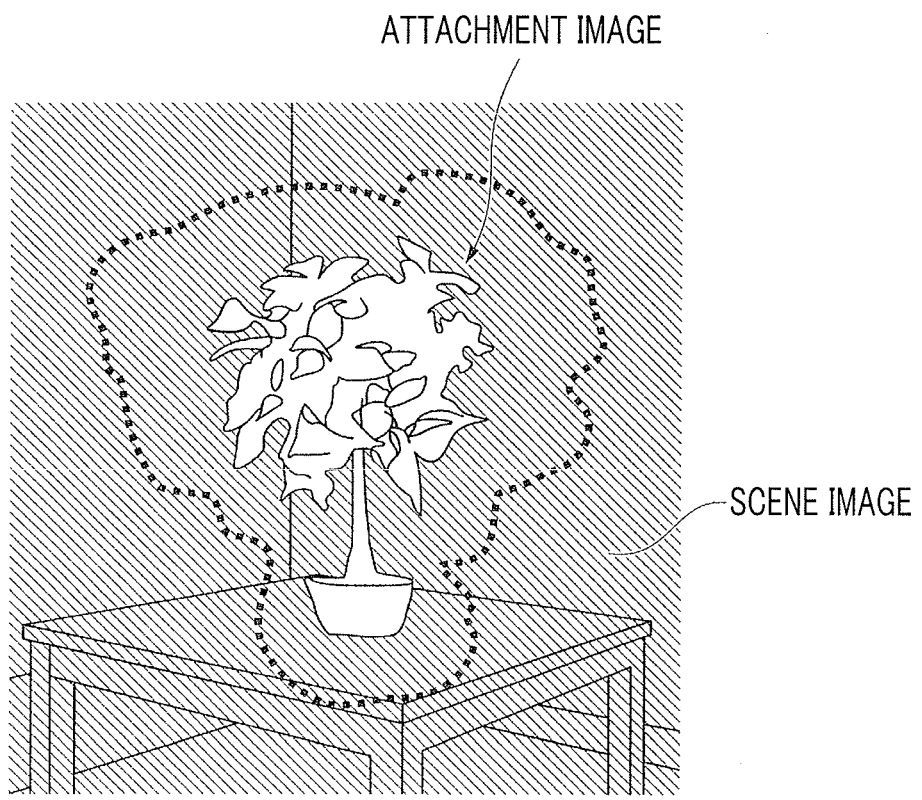
FIG. 7 is a diagram illustrating processing when a feature of a scene image is grasped.

Specifically, referring to FIG. 7 (which is a diagram illustrating processing when the feature of the scene image is grasped), for example, a feature of a portion of the scene image, positioned around a portion where the attachment image is attached (location where the attachment image is disposed), is grasped. More specifically, for example, a feature of an image that is a portion of the scene image, positioned around the attachment image and present within a range of 30 pixels from a boundary between the attachment image and the scene image, is grasped.

Here, for example, when a bright portion and a dark portion are present in the scene image and the attachment image is attached to the dark portion, it is favorable that the feature of the image around the attachment image be reflected into the attachment image to reduce the sense of discomfort, compared with a case where the feature of the entire scene image is reflected into the attachment image. Thus, in the example illustrated in FIG. 7, the feature of the portion of the scene image, positioned around the portion where the attachment image is attached, is grasped.

Further, as another example, instead of the portion around the attachment image, a feature of a portion other than the portion around the attachment image may be grasped. Specifically, for example, a portion (region) of which a feature is to be grasped may be automatically determined based on similarity of chrominances, luminances or frequency bands.

Figure 8:
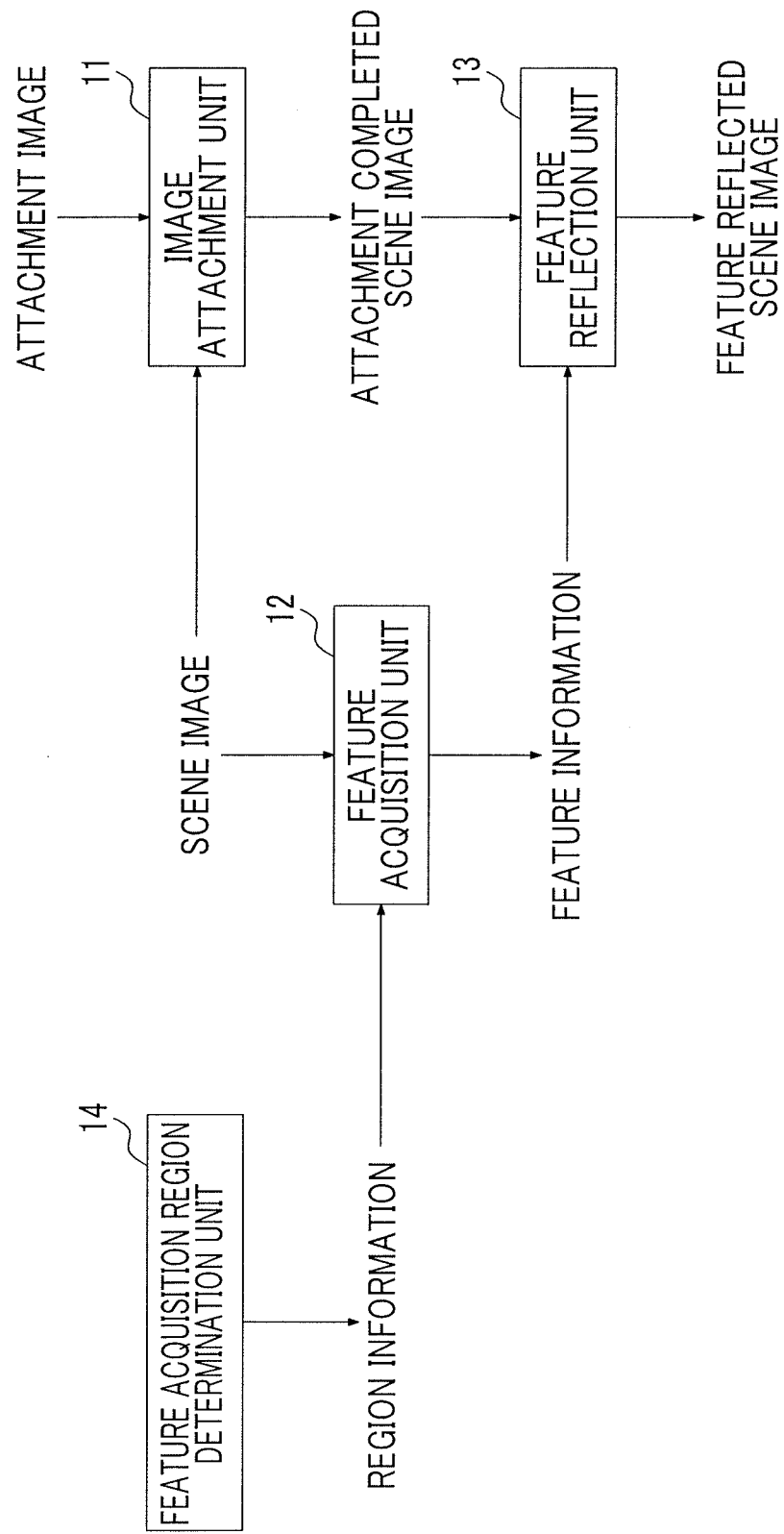
FIG. 8 is a diagram illustrating the flow of processing when a feature reflected scene image is generated by reflecting a feature of a part of a scene image into an attachment image.

FIG. 8 is a diagram illustrating the flow of processing when a feature reflected scene image is generated by reflecting a feature of a part of a scene image into an attachment image. Here, since basic processing is the same as in the processing illustrated in FIG. 4, different points therefrom will be described below.

In the processing illustrated in FIG. 8, a user's manipulation with respect to the scene image displayed on the touch panel (manipulation with respect to the touch panel) is detected by a feature acquisition region determination unit 14, and a region of which a feature is to be grasped in the scene image is determined based on the manipulation.

Here, the region of which the feature is to be grasped in the scene image is determined based on the user's manipulation with respect to the touch panel, but in a type in which the user manipulates a device such as a mouse, the region is grasped based on a user's manipulation with respect to such a device.

In the present exemplary embodiment, region information indicating the region of which the feature is to be grasped is output from the feature acquisition region determination unit 14 to the feature acquisition unit 12.

The feature acquisition unit 12 grasps the feature of the portion of the scene image, positioned in the region specified by the region information. Specifically, the feature acquisition unit 12 acquires $E(L^*_{scene})$, $E(a^*_{scene})$ and $E(b^*_{scene})$ that are the average values of the L*, the a* and the b* pixel values, and $V(L^*_{scene})$, $V(a^*_{scene})$ and $V(b^*_{scene})$ that are the variances of the L*, the a* and the b*, illustrated in FIGS. 5B, 5D and 5F, with respect to the region specified by the region information.

Thereafter, the feature information acquired by the feature acquisition unit 12 is output to the feature reflection unit 13, and then, the feature reflection unit 13 reflects the feature into the attachment completed scene image. Thus, the feature reflected scene image that is the scene image in which the feature is reflected into the attachment image is generated. In other words, using the above-mentioned Expressions (1) to (3), the Lab pixel values of the scene image in which the feature is reflected into the attachment image are acquired.

Figure 9A:
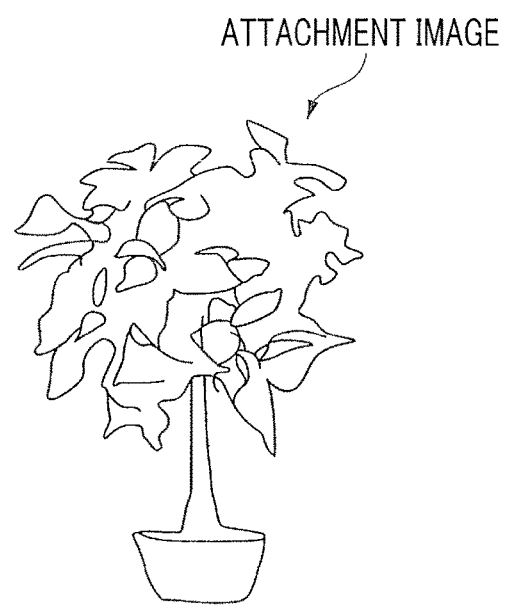
FIGS. 9A and 9B are diagrams illustrating another processing example performed in an image processing apparatus.
Figure 9B:

FIGS. 9A and 9B are diagrams illustrating another processing example performed in the image processing apparatus 1.

In this processing, the feature of the scene image is not reflected into the entire attachment image, but is reflected into a part of the attachment image. Specifically, as illustrated in FIG. 9B, for example, the feature of the scene image is reflected into a portion close to the outline of the attachment image. More specifically, for example, a region between the outline of the attachment image and a line inwardly separated from the outline by a designated number of pixels inward is set as a feature reflection region, and the feature of the scene image is reflected into the feature reflection region. In this way, when the feature of the scene image is reflected into the part of the attachment image, the feature of the attachment image partially remains while reducing the sense of discomfort of the feature reflected scene image.

The portion of the attachment image into which the feature is to be reflected may be determined based on an instruction of the user, or may be automatically determined based on similarity of chrominances, luminances or frequency bands.

Further, in the example illustrated in FIGS. 9A and 9B, the feature is reflected into the portion of the outline (portion close to the outline) of the attachment image, but instead, the feature may be reflected into an inner portion of the attachment image. Further, for example, when the attachment image is the "flowerpot", the feature may be reflected into only a "flower" portion, or may be reflected into only a "pot" portion.

Figure 10:
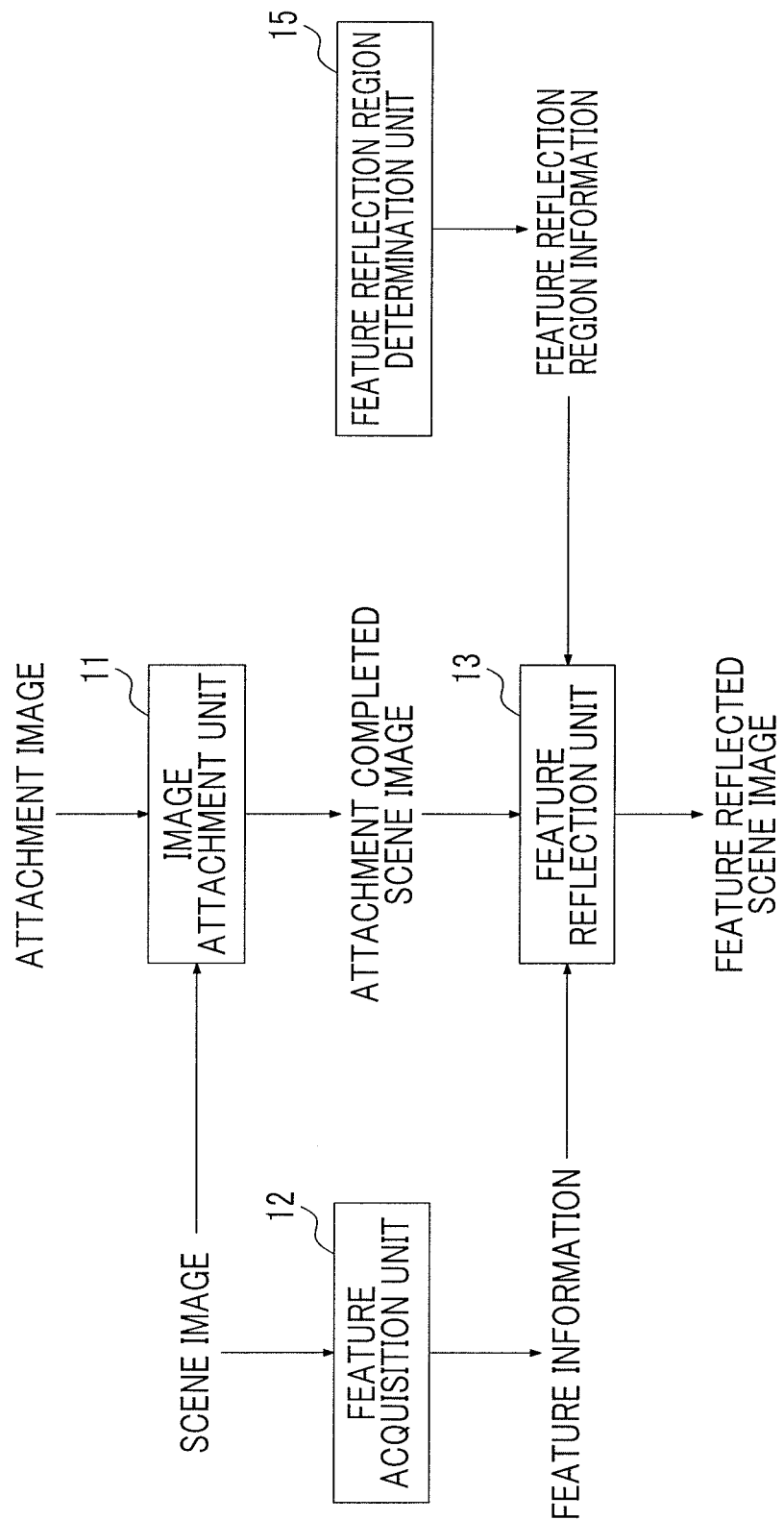
FIG. 10 is a diagram illustrating the flow of processing executed by a control unit when a feature of a scene image is reflected into a part of an attachment image.

FIG. 10 is a diagram illustrating the flow of processing executed by the control unit 100 when a feature of a scene image is reflected into a part of an attachment image. Here, since basic processing is the same as in the processing illustrated in FIG. 4, different points therefrom will be described below.

In the processing illustrated in FIG. 10, a user's manipulation with respect to the scene image displayed on the touch panel is detected by a feature reflection region determination unit 15, and a region of the attachment image into which the feature is to be reflected is determined based on the detection result.

Further, information relating to a feature reflection region that is the region into which the feature is to be reflected is output to the feature reflection unit 13. Here, the region into which the feature is to be reflected is determined based on the user's manipulation with respect to the touch panel, but the region into which the feature is to be reflected may be determined based on information input from the user through an external device such as a mouse, similar to the above-described feature grasping.

When reflecting the feature of the scene image into the attachment image, the feature reflection unit 13 reflects the feature of the scene image into the region of the attachment image specified by the feature reflection region.

Specifically, the feature reflection unit 13 acquires the Lab pixel values of the attachment image after the feature is reflected thereto using the above-mentioned Expressions (1) to (3).

When Expressions (1) to (3) are applied, $E(L^*_{clip})$, $E(a^*_{clip})$ and $E(b^*_{clip})$ in Expressions (1) to (3) represent average values of $L^*$, $a^*$ and $b^*$ values of the feature reflection region, and $V(L^*_{clip})$, $V(a^*_{clip})$ and $V(b^*_{clip})$ represent variances of the L, the a* and the b* values of the feature reflection region.

FIG. 11 is a diagram illustrating another processing example performed in the image processing apparatus 1. All of scene images illustrated in FIG. 11 are feature reflected scene images in which the feature is reflected into the attachment image. In this processing example, the degree of reflection of the feature into the attachment image may be changed. Thus, if the degree of reflection is changed, the state of the attachment image is changed as illustrated in FIG. 11. Accordingly, the user may obtain a feature reflected scene image close to his or her preference.

Figure 12:
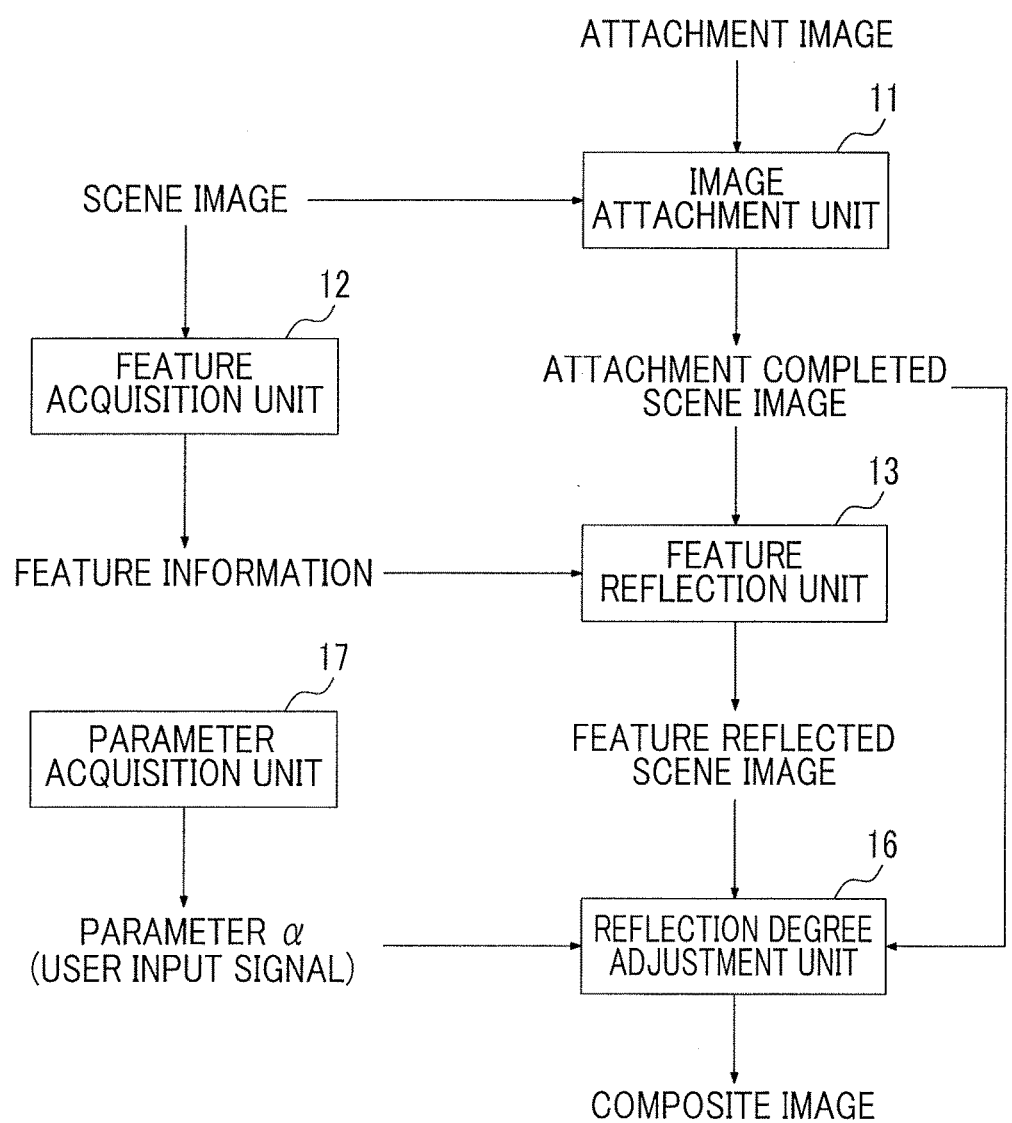
FIG. 12 is a diagram illustrating the flow of processing executed by a control unit when the degree of feature reflection into an attachment image is changed.

FIG. 12 is a diagram illustrating the flow of processing executed by the control unit 100 when the degree of feature reflection into an attachment image is changed. Here, similarly, since basic processing is the same as in the processing illustrated in FIG. 4, different points therefrom will be described below.

In the processing illustrated in FIG. 12, the attachment completed scene image generated by the image attachment unit 11 and the feature reflected scene image generated by the feature reflection unit 13 are input to a reflection degree adjustment unit 16 that changes the degree of reflection of the feature into the attachment image.

The feature reflection unit 13 performs the process of reflecting 100% of the feature of the scene image into the attachment image to generate a scene image including the attachment image in which the degree of reflection of the feature of the scene image is 100%. Thus, the feature reflected scene image including the attachment image in which the degree of reflection of the feature of the scene image is 100% is input to the reflection degree adjustment unit 16.

On the other hand, in the attachment completed scene image, since the feature of the scene image is not yet reflected into the attachment image, the attachment completed scene image including the attachment image in which the degree of reflection of the feature of the scene image is 0% is input to the reflection degree adjustment unit 16.

Further, in the present exemplary embodiment, a parameter acquisition unit 17 that functions as an adjustment value acquisition unit that acquires an adjustment value indicating the degree of reflection of the feature of the scene image into the attachment image from the user is provided. The parameter acquisition unit 17 detects a user's manipulation with respect to the touch panel (display screen) to acquire a parameter α input by the user.

Further, when the parameter α is acquired by the parameter acquisition unit 17, the parameter α is output from the parameter acquisition unit 17 to the reflection degree adjustment unit 16. Here, as mentioned above, the parameter α represents the degree of reflection of the feature of the scene image into the attachment image, which is a value from 0 to 1 ($0 \leq \alpha \leq 1$).

After the parameter α is received, the reflection degree adjustment unit 16 performs composition of the attachment completed scene image and the feature reflected scene image using the parameter α and the following Expressions (4) to (6) to obtain a composite image.

$$L^{*\prime} = \alpha L^*_{merged} + (1-\alpha) L^*_{pasted} \quad (4)$$

$$a^{*\prime} = \alpha a^*_{merged} + (1-\alpha) a^*_{pasted} \quad (5)$$

$$b^{*\prime} = \alpha b^*_{merged} + (1-\alpha) b^*_{pasted} \quad (6)$$

Here, in the respective Expressions (4) to (6), $L^*_{pasted}$, $a^*_{pasted}$ and $b^*_{pasted}$ represent pixel values of the attachment completed scene image, $L^*_{merged}$, $a^*_{merged}$ and $b^*_{merged}$ represent pixel values of the feature reflected scene image, and $L^{*\prime}$, $a^{*\prime}$ and $b^{*\prime}$ represent pixel values of the composite image.

Here, in the present exemplary embodiment, if the user changes the parameter α, the ratio of the attachment completed scene image and the feature reflected scene image in the composite image is changed. Thus, the user may obtain a feature reflected scene image close to his or her preference. Further, in this processing, as the user decreases the parameter α, the original feature of the attachment image remains while reducing a sense of discomfort of the composite image.

FIGS. 13A to 13D are diagrams illustrating another example of display processing performed in the image processing apparatus 1. Similarly, FIGS. 13A to 13D illustrate an example in which the image processing apparatus 1 is configured by a so-called tablet terminal.

Figure 13A:
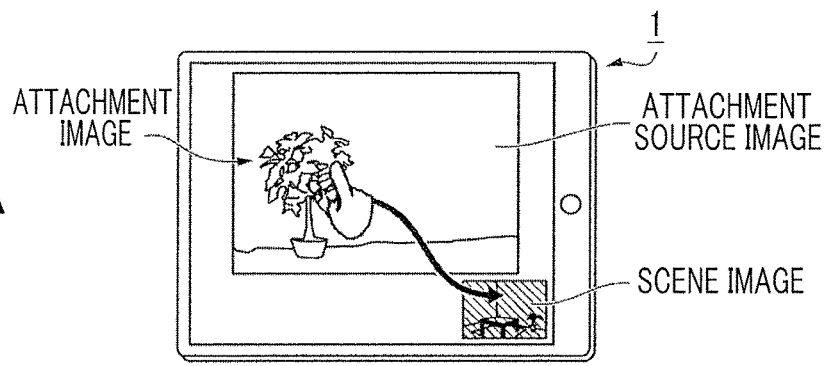
FIGS. 13A to 13D are diagrams illustrating another example of display processing performed in an image processing apparatus.

In this processing, similar to the processing illustrated in FIGS. 6A to 6C, as illustrated in FIG. 13A, the attachment source image and the scene image are displayed on one screen. Further, for example, the user performs overwriting on a portion of the outline of the attachment image included in the attachment source image to separate the attachment image from the attachment source image, thereby generating the attachment image.

Figure 13B:
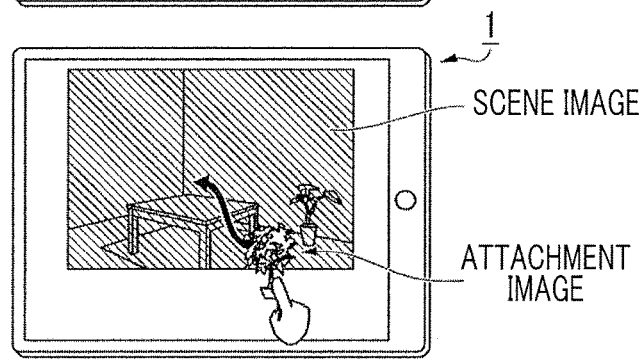

Thereafter, as illustrated in FIG. 13A, the attachment image is moved to the scene image positioned in a lower right part of the screen by drag and drop. Thus, as illustrated in FIG. 13B, the attachment source image disappears, and instead, the scene image is displayed. Then, the user moves the attachment image to a location desired by a user in the scene image, and separates the hand from the display screen. Thus, the attachment image is attached to the scene image.

Figure 13C:
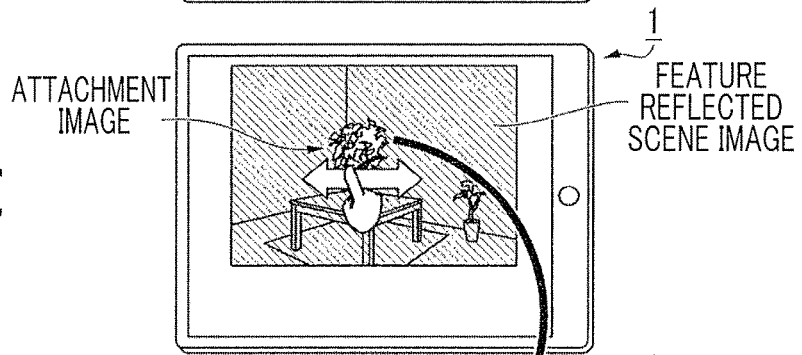

Thereafter, as illustrated in FIG. 13C, the user slides his or her finger to the right or to the left on the touch panel. When the sliding is performed, the parameter acquisition unit 17 acquires the parameter α based on the sliding (based on the movement amount of the finger of the user).

Specifically, for example, when the finger of the user slides to the left in FIG. 13C, the parameter α of a small value is acquired, and when the finger of the user slides to the right in FIG. 13C, the parameter α of a large value is acquired.

Figure 13D:
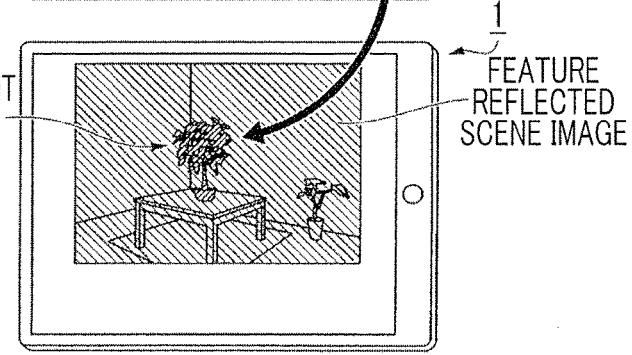

Further, after the parameter α is acquired, the composition of the attachment completed scene image and the feature reflected scene image is performed according to the ratio determined by the parameter α, so that a new feature reflected scene image is generated as illustrated in FIG. 13D.

Other

In the above description, an example in which the image processing apparatus 1 is configured by a so-called tablet terminal is described, but the image processing apparatus 1 may be configured by a personal computer (PC) provided with a monitor, a keyboard, a mouse, and the like.

Further, in the above description, a case where the parameter α is changed by so-called swiping is described, but a configuration in which a sliding display button is displayed on a display screen and a user moves the display button to change the parameter α may be considered. Furthermore, a numerical value of the parameter α may be directly input using numerical keys (which may be hard keys or soft keys). In addition, the parameter α may be input using a mouse, or the like.

Further, in the above-described exemplary embodiment, an example in which the image quality adjustment is performed in the L*a*b* color space is described, but instead, any color space that may change an impression of an image may be used. For example, the same image quality adjustment may be performed in the RGB color space, the Lαβ color space, the IPT color space, or the like.

Further, the image attachment unit 11 may perform the image attachment by any method for simply cutting a part of an image and attaching the cut part to another image. For example, a method for highlighting a joint by solving a Poisson's equation, an α composition method, or the like may be used.

In addition, in the present exemplary embodiment, the processes of grasping the feature of the scene image that is an image obtained by photographing a scene and reflecting the feature into the attachment image is described, but the image for grasping the feature is not limited to the scene image. For example, a feature may be grasped from an image obtained by photographing an object other than the scene, and the feature may be reflected into the attachment image.

In addition, in the present exemplary embodiment, an example in which the respective pixel values of L*, a* and b* are grasped as the feature of the scene image is described, but instead, for example, histogram information relating to gloss of the scene image may be acquired as the feature, and the feature of the scene image may be reflected into the attachment image using the histogram information. In this case, the state of the gloss becomes similar between the scene image and the attachment image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a hardware processor configured to implement:
      a composite image generation unit configured to compose a first image and a second image, and to generate a composite image in which the second image is included in the first image;
      a feature quantity acquisition unit configured to calculate averages and variances of the first image and the second image as included in the first image and to acquire a feature quantity of the first image according to at least one combination of the averages and the variances weighted by each other; and
      a reflection unit configured to reflect a feature of the first image into the second image using the feature quantity of the first image,
   wherein a first of the averages and the variances is calculated from the first image and a second of the averages and variances is calculated from the second image as included in the first image,
   wherein the second image is extracted from a source image which is larger than the first image, and
   wherein the reflection unit is further configured to reflect less than a full amount of the feature of the first image into the second image as included in the first image by using the feature quantity which is obtained according to a plurality of combinations, including the at least one combination, of different ones of the first of the averages and the variances and the second of the averages and the variances each differently weighted by each other respectively.

2. The image processing apparatus according to claim 1, wherein
   the feature quantity acquisition unit is further configured to acquire a feature quantity of a part of the first image, and
   the reflection unit is further configured to reflect the feature of the first image into the second image using the feature quantity of the part of the first image.

3. The image processing apparatus according to claim 2, wherein
   the feature quantity acquisition unit is further configured to acquire, when acquiring the feature quantity of the part of the first image, a feature quantity of a portion of the first image, the portion being positioned outside of a location where the second image is disposed.

4. The image processing apparatus according to claim 1, wherein
   the reflection unit is further configured to reflect the feature of the first image into a part of the second image.

5. The image processing apparatus according to claim 2, wherein
   the reflection unit is further configured to reflect the feature of the first image into a part of the second image.

6. The image processing apparatus according to claim 3, wherein
   the reflection unit is further configured to reflect the feature of the first image into a part of the second image.

7. The image processing apparatus according to claim 1, wherein the hardware processor is further configured to implement:
   an adjustment value acquisition unit configured to acquire, from a user, an adjustment value indicating a reflection degree of the feature of the first image into the second image.

8. The image processing apparatus according to claim 2, wherein the hardware processor is further configured to implement:
   an adjustment value acquisition unit configured to acquire, from a user, an adjustment value indicating a reflection degree of the feature of the first image into the second image.

9. The image processing apparatus according to claim 3, wherein the hardware processor is further configured to implement:
   an adjustment value acquisition unit configured to acquire, from a user, an adjustment value indicating a reflection degree of the feature of the first image into the second image.

10. The image processing apparatus according to claim 4, wherein the hardware processor is further configured to implement:
   an adjustment value acquisition unit configured to acquire, from a user, an adjustment value indicating a reflection degree of the feature of the first image into the second image.

11. The image processing apparatus according to claim 5, wherein the hardware processor is further configured to implement:
   an adjustment value acquisition unit configured to acquire, from a user, an adjustment value indicating a reflection degree of the feature of the first image into the second image.

12. The image processing apparatus according to claim 6, wherein the hardware processor is further configured to implement:
   an adjustment value acquisition unit configured to acquire, from a user, an adjustment value indicating a reflection degree of the feature of the first image into the second image.

13. The image processing apparatus according to claim 1, wherein
   the feature quantity is pixel values of L*, a* and b* or coordinates of the point in other color spaces, or histogram information.

14. The image processing apparatus according to claim 1, wherein
   a variance, of the variances, represents a portion of the first image, the portion is within a predetermined distance from the location where the second image is included in the first image.

15. The image processing apparatus according to claim 14, wherein the predetermined distance is thirty pixels from an outer boundary of the second image.

16. The image processing apparatus according to claim 14, wherein a position of the portion is determined in response to the location where the second image is included in the first image.

17. The image processing apparatus according to claim 1, wherein reflection of the feature of the first image into the second image by the reflection unit comprises changing variances of the second image according to variances of the first image such that the variances of the second image are closer to the variances of the first image after the reflection than before the reflection.

18. The image processing apparatus according to claim 1, wherein the at least one combination of the averages and the variances comprises at least one of:

$$L^{*\prime}=(L^*-E(L^*_{clip}))(V(L^*_{scene})/V(L^*_{clip}))+E(L^*_{scene}) \quad (1),$$

$$a^{*\prime}=(a^*-E(a^*_{clip}))(V(a^*_{scene})/V(a^*_{clip}))+E(a^*_{scene}) \quad (2),$$

$$b^{*\prime}=(b^*-E(b^*_{clip}))(V(b^*_{scene})/V(b^*_{clip}))+E(b^*_{scene}) \quad (3),$$

wherein $E(L^*_{scene})$, $E(a^*_{scene})$ and $E(b^*_{scene})$ are respectively first averages of pixel values scene, of L* pixels, A* pixels and b* pixels of the first image in an L*a*b* color space, wherein $V(L^*_{scene})$, $V(a^*_{scene})$ and $V(b^*_{scene})$ are respectively first variances of the pixel values of the L* pixels, the A* pixels and the b* pixels of the first image in the L*a*b* color space, wherein $E(L^*_{clip})$, $E(a^*_{chp})$ and $E(b^*_{clip})$ are respectively second averages of pixel values of L* pixels, A* pixels and b* pixels of the second image in the L*a*b* color space, wherein $V(L^*_{clip})$, $V(a^*_{clip})$ and $V(b^*_{clip})$ are respectively second variances of the pixel vales of the L* pixels, the A* pixels and the b* pixels of the second image in the L*a*b* color space, wherein the averages comprise at least ones of the first averages and the second averages, and wherein the variances comprise at least ones of the first variances and the second variances.

19. An image processing apparatus comprising:
   a hardware processor configured to implement:
      a composite image generation unit configured to compose a first image and a second image, and to generate a composite image in which the second image is included in the first image;
      a feature quantity acquisition unit configured to calculate averages and variances of the first image and the second image as included in the first image and to acquire a feature quantity of the first image according to at least one combination of the averages and the variances weighted by each other; and
      a reflection unit configured to reflect a feature of the first image into the second image using the feature quantity of the first image, wherein the reflection unit is further configured to reflect the feature of the first image into the second image, as included in the first image, such that a predetermined distance within the second image and from a boundary of the second image, as included in the first image and from the first image towards a center of the second image, includes reflection of the features and such that a remainder of the second image, as included in the first image and not within the predetermined distance, does not reflect the feature.

20. A non-transitory computer readable medium that stores a program that causes a computer to execute functions comprising:
   composing a first image and a second image to be attached to the first image;
   generating a composite image in which the second image is included in the first image;
   calculating averages and variances of the first image and the second image as included in the first image;
   acquiring a feature quantity of the first image according to at least one combination of the averages and the variances weighted by each other; and
   reflecting a feature of the first image into the second image using the feature quantity of the first image,
   wherein a first of the averages and the variances is calculated from the first image and a second of the averages and variances is calculated from the second image as included in the first image,
   wherein the second image is extracted from a source image which is larger than the first image, and
   wherein the functions further comprise reflecting less than a full amount of the feature of the first image into the second image as included in the first image by using the feature quantity which is obtained according to a plurality of combinations, including the at least one combination, of different ones of the first of the averages and the variances and the second of the averages and the variances each differently weighted by each other respectively.

21. The computer readable medium according to claim 20, wherein the feature quantity is pixel values of L*, a* and b* or coordinates of the point in other color spaces, or histogram information.

* * * * *